United States Patent
Kook et al.

(10) Patent No.: US 9,284,036 B2
(45) Date of Patent: Mar. 15, 2016

(54) FLOOR PLATE FOR COVERING A FLOOR FRAMEWORK IN AN AIRCRAFT

(75) Inventors: Manfred Kook, Hamburg (DE); Wolfram Schopenhauer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 585 days.

(21) Appl. No.: 12/341,390

(22) Filed: Dec. 22, 2008

(65) Prior Publication Data

US 2009/0166472 A1 Jul. 2, 2009

Related U.S. Application Data

(60) Provisional application No. 61/009,311, filed on Dec. 27, 2007.

(51) Int. Cl.
*B64C 1/18* (2006.01)
*B64D 11/00* (2006.01)

(52) U.S. Cl.
CPC ........... *B64C 1/18* (2013.01); *B64D 2011/0046* (2013.01)

(58) Field of Classification Search
CPC ......................... B64C 1/18; D64D 2011/0046
USPC .............. 244/118.1, 118.5, 119; 52/511, 512, 52/126.2, 126.5, 264
See application file for complete search history.

(56) References Cited

U.S. PATENT DOCUMENTS

| | | | | |
|---|---|---|---|---|
| 3,381,921 | A | * | 5/1968 | Mcdonough et al. ........... 410/79 |
| 3,753,541 | A | * | 8/1973 | Grueber et al. ............ 244/137.1 |
| 4,682,453 | A | * | 7/1987 | Holmgren ..................... 52/126.2 |
| 5,083,727 | A | * | 1/1992 | Pompei et al. ............. 244/118.6 |
| 6,068,214 | A | * | 5/2000 | Kook et al. ................. 244/118.1 |
| 6,202,374 | B1 | * | 3/2001 | Cooper et al. ............... 52/220.3 |

(Continued)

FOREIGN PATENT DOCUMENTS

| | | |
|---|---|---|
| DE | 101 45 276 | 7/2003 |
| DE | 102 23 840 | 12/2003 |

(Continued)

OTHER PUBLICATIONS

German Office Action for DE 10 2007 062 747.7 dated Nov. 17, 2011.

(Continued)

*Primary Examiner* — Elizabeth A Plummer
(74) *Attorney, Agent, or Firm* — Jenkins, Wilson, Taylor & Hunt, P.A.

(57) ABSTRACT

The invention relates to a floor plate for bearing upon a floor framework in an aircraft. The floor framework is formed with a multiplicity of transverse beams which are arranged like a truss, and a multiplicity of longitudinal profiles, especially seat rail profiles, which extend transversely to the transverse beam. At least one sub-assembly, for example a kitchen module and/or a sanitary cell, can be fastened on the floor plate. The floor plate bears upon at least four longitudinal profiles and has at least one connecting point, especially an insert, for fastening of the sub-assembly. In addition, at least one system port is provided for the tool-less, pluggable connecting of the sub-assembly to any on-board systems of the aircraft, especially to electrical systems, to feed-air systems, to exhaust air systems, to fresh-water systems or to waste-water systems.

11 Claims, 2 Drawing Sheets

(56) References Cited

U.S. PATENT DOCUMENTS

| | | |
|---|---|---|
| 6,743,976 B2 | 6/2004 | Motzigkeit |
| 6,927,334 B2 | 8/2005 | Lambiaso |
| 7,073,994 B2 * | 7/2006 | Huber et al. .................. 410/92 |
| 7,093,797 B2 * | 8/2006 | Grether et al. ............. 244/118.1 |
| 7,195,201 B2 * | 3/2007 | Grether et al. ............. 244/118.1 |
| 7,475,850 B2 * | 1/2009 | Vetillard et al. ........... 244/117 R |
| 7,913,950 B2 * | 3/2011 | Huber ........................ 244/118.1 |
| 2007/0102579 A1 * | 5/2007 | Krieglsteiner et al. .... 244/129.1 |
| 2007/0181745 A1 * | 8/2007 | Huber ........................ 244/118.1 |
| 2008/0302060 A1 * | 12/2008 | Ciprian ...................... 52/787.12 |
| 2009/0294587 A1 * | 12/2009 | Ricaud et al. ................. 244/119 |
| 2011/0068226 A1 * | 3/2011 | Baatz et al. ................ 244/118.6 |

FOREIGN PATENT DOCUMENTS

| | | |
|---|---|---|
| DE | 102004012249 | 10/2004 |
| DE | 102005058241 | 9/2006 |
| DE | 102005045181 | 4/2007 |
| EP | 0006016 A1 * | 12/1979 |
| GB | 706614 * | 3/1954 |
| GB | 2 400 242 | 6/2004 |
| GB | 2 423 224 | 8/2006 |

OTHER PUBLICATIONS

German Office Action for DE 10 2007 062 747.7 dated Sep. 11, 2013.

* cited by examiner

FLOOR PLATE FOR COVERING A FLOOR FRAMEWORK IN AN AIRCRAFT

CROSS-REFERENCE TO RELATED APPLICATIONS

This application claims priority to U.S. Provisional Application No. 61/009,311, filed Dec. 27, 2007.

FIELD OF THE INVENTION

The invention relates to a floor plate for covering a floor framework in an aircraft, wherein the floor framework is formed with a multiplicity of transverse beams and with a multiplicity of longitudinal profiles, especially seat rail profiles, which extend at an angle of about 90° to the transverse beams, wherein at least one sub-assembly can be fastened on the floor plate, and the floor plate can be connected with fastening devices, especially with screws and/or rivets, to the floor framework, especially to the longitudinal profiles.

BACKGROUND OF THE INVENTION

For creating a walkable floor, a floor framework is customarily arranged in the fuselage cell of an aircraft. The floor framework comprises a multiplicity of transverse beams which are arranged transversely to the direction of flight. A multiplicity of longitudinal profiles, which are arranged in an essentially parallel spaced apart manner to each other, are attached on the transverse beams and together with the transverse beams form the truss-like floor framework. The longitudinal profiles are preferably formed as so-called seat rail profiles which allow a largely positionally variable fastening of passenger seats in the direction of flight in a grid of typically 2.54 cm. Floor plates are inserted and fastened between the seat rail profiles for creating an essentially flat and walkable floor. The floor plates preferably terminate in a flush manner with the upper edge of the seat rail profiles.

In the course of the further interior equipping of a passenger aircraft cabin, further sub-assemblies are arranged and fastened on the floor. These sub-assemblies for example can be kitchen modules, wet cells, washrooms and toilets, sleeping cabins, storage systems for supplies, housings for technical devices, or the like.

At present, these sub-assemblies can only be fastened in the areas in which longitudinal profiles and/or transverse beams extend since a mechanical connection of the sub-assembly to the floor framework is made, as a result of which the positionability of the sub-assemblies on the floor framework is considerably limited. Furthermore, it is especially necessary in the case of heavy sub-assemblies to integrate additional reinforcing profiles (so-called "structure provisions") into the floor framework which increase the overall weight of the floor framework. The two aspects make any changes to the positioning of the sub-assemblies on the floor of the passenger cabin more difficult, as a result of which customer-specific equipping wishes or constructionally related changes of the installation point of the sub-assemblies are to be realized only at increased cost. Furthermore, because of the reinforcing profiles which are to be provided during the interior equipping of the passenger cabin, the installation and storage cost is increased.

SUMMARY OF THE INVENTION

It is one of the objects of the invention to create a floor plate for creating a floor in a passenger cabin of an aircraft, which allows a fastening of sub-assemblies independently of the grid of the floor framework. Furthermore, the floor plate is to be able to be fastened on the floor framework in a manner which is as positionally variable as possible.

Accordingly, a floor plate for covering a floor framework in an aircraft is provided, wherein the floor framework is formed with a multiplicity of transverse beams and with a multiplicity of longitudinal profiles, which extend at an angle of about 90° to the transverse beams, wherein at least one sub-assembly can be fastened on the floor plate, and the floor plate can be connected to the floor framework with fastening devices, wherein the floor plate bears on at least four longitudinal profiles, wherein the floor plate has at least one connecting point for fastening the at least one sub-assembly on the floor plate independently of the installation point on the floor framework, and wherein at least one system port is arranged in the region of the floor plate.

By the floor plate resting upon at least four longitudinal profiles and the floor plate having at least one connecting point for fastening the at least one sub-assembly on the floor plate independently of the installation point on the floor framework, wherein at least one system port is arranged in the region of the floor plate, it is possible for the first time to install a sub-assembly on the floor plate independently of the grid of the floor framework which is located beneath it. In this case, the floor plate may be statically dimensioned so that even heavier sub-assemblies can be arranged upon it without additional reinforcing measures. Sub-assemblies which can be installed on the floor plate for example can be kitchen modules, complete kitchens ("galleys"), sanitary or wet cells, housings for technical devices, sleeping rooms for the crew or passengers, systems for stocking or storing, provision of seating, or the like.

The at least one connecting point may be a so-called "monument" which allows a direct mechanical fastening of the sub-assembly. In case the floor plate is formed as a sandwich plate, the "monument" for example can be an "insert" into which customary threaded connections can be introduced for the fastening of the sub-assembly. After introducing a correspondingly dimensioned hole, the insert is adhesively fastened, or foamed in place, in the sandwich plate. The sandwich plate may have a honeycomb-like structure which is formed with NOMEX® paper (e.g., a flame resistant meta-aramid material developed by DuPont Corporation), and is provided with facings on both sides. Alternatively, a metallic core structure can also be used. The facings can be formed with a metallic and/or a fiber-reinforced plastic material, such as a glass fiber-reinforced phenolic resin or a carbon fiber-reinforced epoxide resin.

The surface of the floor plate may be dimensioned so that it bears on at least four longitudinal profiles of the floor framework and is at least slightly larger than a base area of the sub-assembly which is to be installed.

The floor plate itself can be fixed on at least two longitudinal profiles by means of suitable fastening devices. The fastening devices can be screws, rivets, straddling dowels, snap-in elements or clamping elements, or any combination of these. Alternatively, the floor plate can also be adhesively fastened to the longitudinal profiles, or, in case the floor plate is formed with a metallic material, can also be welded to the longitudinal profiles, at least in areas.

One embodiment of the floor plate provides that by means of the at least one so-called system port the at least one sub-assembly can be connected to an on-board system of the aircraft, especially to an electrical system, a hydraulic system, a pneumatic system, a feed-air system, an exhaust-air system, an air-conditioning system, a fresh-water system, or a waste-water system.

As a result of this, a simple and especially positionally flexible connecting of a sub-assembly, which is arranged on the floor plate, to the supply infrastructure of the aircraft is provided. The system port which is integrated directly into the floor plate for example can be formed as double-ended or two-way electrical plug-in socket, wherein one plug-in socket is arranged in an upper side of the floor plate and a second plug-in socket can be arranged opposite this in an underside of the floor plate. Therefore, the sub-assembly, which is fastened on the floor plate, can be connected to the system port by means of simple tool-less plugging in of a sub-assembly connecting cable, which is provided with a corresponding plug, into the upper plug-in socket. The connecting of the system port to the electrical on-board system of the aircraft for example can be carried out by means of a supply cable which is led in on the underside, the (end) plug of which is plugged into the plug-in socket of the system port, which is arranged in the floor plate on the underside, from the bottom. Alternatively, the system port can also be designed as a two-way plug.

For connecting to other and/or further supply systems of the aircraft, the system port is to be correspondingly modified. For example, the system port can be configured as a double hydraulic socket which can be interconnected with a hydraulic plug of a sub-assembly (hydraulic plug-in connection), for example without the use of tools, in order to enable a connection to an on-board hydraulic system of the aircraft. Connecting of the system port to the hydraulic system of the aircraft is carried out via a further hydraulic socket, which is arranged on the floor plate on the underside, into which a connecting hose with a plug-in connector can be plugged without the use of tools.

If the sub-assembly for example is a kitchen (so-called "galley"), a kitchen module or a sanitary or wet cell, the system port serves at the same time for the connection to the electrical on-board system, to the fresh-water system, to the waste-water system, and also to the aeration and ventilation system or to the air-conditioning system of the aircraft.

The system port is therefore to be considered as a universal interfacing point, or a universal interface, between one or more sub-assemblies and one or more on-board systems of the aircraft.

It is of vital importance that the system port on the manufacturing side is integrated directly into the floor plate so that further installation steps during installation are dispensed with.

In accordance with a further embodiment of the floor plate, the at least one sub-assembly, which is arranged on the floor plate, can be connected to the on-board system of the aircraft by means of the at least one system port without the use of tools.

As a result of this, the installation effort which is required for connecting the sub-assembly to the on-board system of the aircraft is significantly reduced since the connecting of the sub-assembly to any on-board systems is carried out by means of for example snap-in plug-in connections inside the system port.

A further embodiment provides that the floor plate, at least in areas, is provided with at least one structural reinforcement, especially with at least one thickened portion, and that this structural reinforcement is an integral part of the floor plate.

As a result of this, it becomes possible to install even heavy sub-assemblies directly on the floor plate without the need of prior installation of additional reinforcing profiles. All the floor plates may have thickened portions which are arranged or positioned as standard, the distance of which from each other corresponds approximately to a respective seat rail distance.

BRIEF DESCRIPTION OF THE DRAWINGS

The present invention is explained in more detail below using preferred exemplary embodiments and with reference to the attached figures of the drawings, in which.

In the figures, like reference numerals refer to identical or functionally identical components unless otherwise stated.

DETAILED DESCRIPTION OF THE INVENTION

Figure 1:
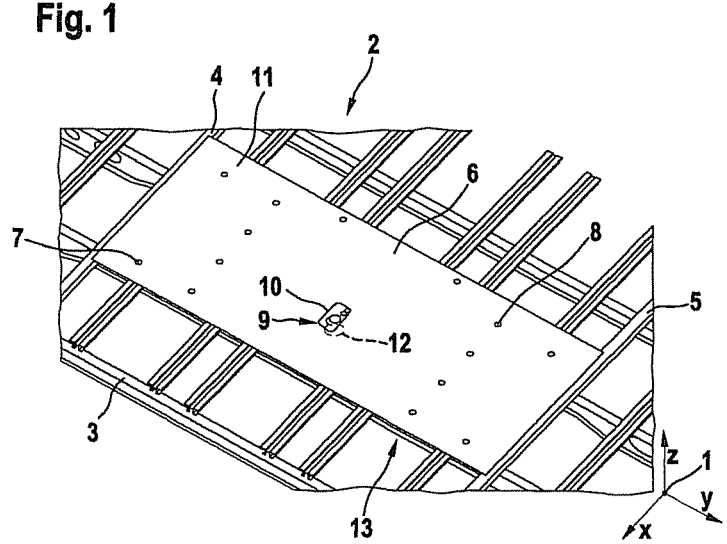
FIG. 1 shows a perspective view of the floor framework with the floor plate and a system port.

FIG. 1 shows a perspective view of a detail of a floor framework in an aircraft with a bearing floor plate, wherein the floor plate is provided with a system port.

A coordinate system 1 illustrates the position of all the components in space. A floor framework 2 of an aircraft, which is not shown, comprises inter alia a multiplicity of transverse beams which extend in a parallel spaced-apart manner, of which only one transverse beam 3 is provided with a designation, which is representative for the rest. All the transverse beams extend essentially parallel to the y-axis of the coordinate system 1 and are connected to other elements, which are not shown, of the fuselage cell structure of the aircraft, such as ring frames, samer rods, or the like. A multiplicity of seat rail profiles as longitudinal reinforcing elements bear upon the transverse beams 3, of which only two outer seat rail profiles 4, 5 are provided with a designation, which is representative for all further seat rail profiles.

A floor plate 6 bears upon the seat rail profiles 4, 5 and upon the seat rail profiles which are not provided with a designation and which extend between them, and is fastened at least on the two outer seat rail profiles 4, 5. The fastening of the floor plate 6 is carried out in this case with the same fitting system which is customarily used for fastening the passenger seating in the seat rail profiles 4, 5. The two outer seat rail profiles 4, 5, in an alternative embodiment, can also be constructed as profiled beams with for example a double-T-shaped cross-sectional geometry, wherein a hole grid which extends parallel to the x-axis of the coordinate system 1 and is for fastening the edge regions of the floor plate 6 (with regard to the y-axis) is introduced in each case in the upper top flanges of the two profiled beams. Fastening of the floor plate 6 is carried out in this constellation for example by means of screws, rivets or snap-in connectors and/or clamping connectors which are introduced into the holes of the grid. The profiled beams themselves, corresponding to the seat rail profiles, bear in turn upon the transverse beams 3 which extend beneath them and are connected to these in a fixed manner.

A multiplicity of connecting points are integrated into the floor plate 6, of which only two connecting points 7, 8 are provided with a designation, which is representative for the rest. The floor plate 6 for example can be formed in a known manner as a sandwich plate, wherein a core structure is provided with facings on both sides. The preferably honeycomb-like core structure for example is formed with NOMEX® paper (e.g., a flame resistant meta-aramid material developed by DuPont Corporation) and/or with metal foil, while the facings consist of a fiber-reinforced plastic material and/or a metallic material. In case the floor plate 6 is constructed in a sandwich type of construction, the connecting points 7, 8 (so-called monuments) for example can be formed with inserts. For integration of an insert into the floor plate 6, a hole is introduced at the intended point, and the insert is inserted and cast in, or foamed in place, with a curable plastic material. The insert for example enables the connection of a sub-assembly by means of a conventional threaded connection.

The floor plate 6 has a system port 9 in a centre region. The system port 9 serves for the connecting or coupling of a sub-assembly (cf. especially FIG. 2), which is to be fastened on the floor plate 6, to an on-board system, which is not shown in more detail, or to a technical infrastructure of the aircraft. The on-board system for example can be any electrical system, a hydraulic system, a pneumatic system, a feed-air system, an exhaust-air system, an air-conditioning system, a fresh-water system or a waste-water system inside the aircraft. The system port 9 for example can be constructed as an at least one double-ended plug-in connection. In this case, the system port 9 comprises at least one first plug-in connector 10 in the region of an upper side 11 of the floor plate, and at least one second plug-in connector 12 in the region of the underside 13 of the floor plate 6. The plug-in connectors 10, 12 can selectively be formed as a socket or as a plug. As a result, the system port 9 virtually represents a "plug-in socket" or "double plug", via which the connecting of the sub-assembly to the technical infrastructure of the aircraft is carried out in a simple manner.

The connecting of the system port 9 to the on-board system of the aircraft for example is carried out via a feed line and/or a hose which allows a tool-less connection at its end to the plug-in connector 12 on the underside. In accordance with this, the connecting of the sub-assembly to the system port 9 is carried out for example without the use of tools by means of a feed line and/or a hose, which at one end allows a manual, that is to say tool-less, connecting of the feed line or of the hose to the first plug-in connector 10. For securing the plug-in connector 10, 12 against inadvertent unplugging from the system port 9, devices such as safety levers or locking levers can be provided.

If a sub-assembly which is to be fastened upon the floor plate 6 is to be supplied for example with electricity, then the plug-in connector 12 of the system port 9 which is arranged in the region of the underside 13 of the floor plate 6 is configured as a plug-in socket into which a feed line cable or supply cable of the electrical on-board system of the aircraft can be plugged without the use of tools and locked therein. The electrical connecting of the sub-assembly is then carried out for example via a sub-assembly connecting cable, the end of which can be plugged into the plug-in connector 10 of the system port 9, which is configured as a plug-in socket, and if necessary locked therein. Alternatively, at least one plug can be integrated into the sub-assembly 14 on the underside, which when mounting the sub-assembly 14 onto the connecting points 7, 8 automatically makes the necessary connections or contacts to the sockets inside the system port 9 which is arranged in the region of the upper side 11 of the floor plate 6. The connection between the sub-assembly 14 and the system port 9 can alternatively be made only after the mounting and fastening of the sub-assembly 14 on the floor plate 6 by operating a component for example in the form of a pivotable lever or the like. The plug-in connectors 10, 12 or couplings of the system port 9 are adapted in each case to the type of on-board system which is to be connected in. The system port 9 can selectively be formed with sockets and/or with plugs for creating a pluggable connection (plug-in connection).

For connecting a sub-assembly to the hydraulic system or to the compressed air system of the aircraft, special plug-in connectors are required inside the system port 9. The same applies to the connecting-in of water and waste-water lines and also of air-conditioning lines. Each system port 9 can have a multiplicity of different plug-in connectors 10, 12 for the connecting-in in each case of different on-board systems of the aircraft. The at least one system port 9 can be standardized at least for one type of aircraft.

The mechanical connecting of a sub-assembly to the floor plate 6 is carried out by means of the connecting points 7, 8 and also by means of the further connecting points which are not provided with a designation, and as a result is independent of the floor framework 2. The floor plate 6, in the exemplary embodiment which is illustrated in FIG. 1, is connected to the floor framework 2 in the region of the outer seat rail profiles 4, 5. The fastening of the floor plate 6 on the seat rail profiles 4, 5 for example can be carried out with screws, with rivets, with straddling dowels, or with snap-in connections or clamping connections. Alternatively, an adhesive fastening of the floor plate 6 to the seat rail profiles 4, 5, for example by means of double-sided adhesive strips or the like, can also be carried out.

On account of the decoupling between the fastening of the sub-assembly on the floor plate 6 and the mechanical connecting of the floor plate 6 on the floor framework 2, which decoupling is made possible for the first time by means of the floor plate, a sub-assembly can be fastened on the floor framework 2 at almost any conceivable position. As a result of this, a very quick and flexible adaptation of the interior equipment of a passenger aircraft to special customer wishes is possible. Furthermore, the extent of stockholding, the installation cost and the weight of the floor framework 2 can be reduced since it is no longer necessary to integrate additional reinforcing elements inside the floor framework beneath the installation area of the sub-assembly.

Figure 2:
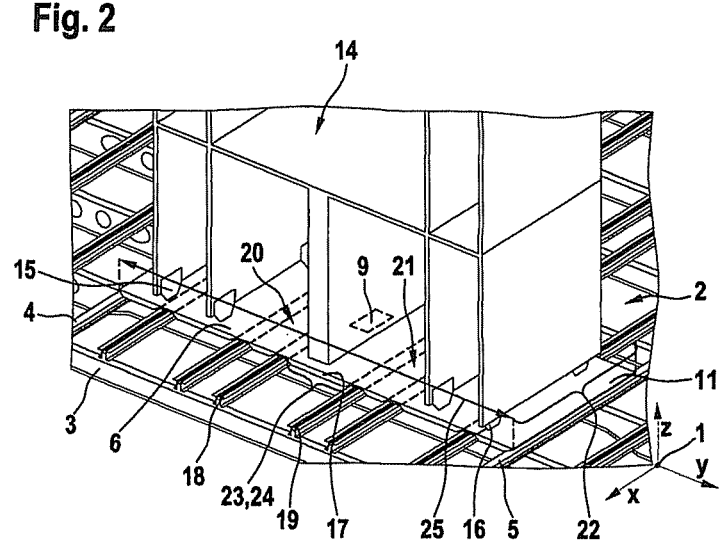
FIG. 2 shows a perspective view of a floor framework with a floor plate, with a sub-assembly, arranged thereupon.

FIG. 2 shows in a perspective view the floor plate 6, which is fastened on the floor framework 2, with a sub-assembly 14 arranged upon the floor plate. The sub-assembly 14 is a still open shelf system for the stocking or storing of goods.

For the mechanical fastening of the sub-assembly 14 on the floor plate 6, the sub-assembly 14 has a multiplicity of so-called monuments on the underside, of which only two monuments 15, 16 are provided with a designation. The monuments 15, 16 for example can be (cylindrical) screws which can be screwed into the connecting points 7, 8, which for example are formed as inserts, inside the floor plate 6. Over and above their pure fastening function, the monuments 15, 16 of the sub-assembly 14 can enable height adjustment of the sub-assembly 14 with regard to the upper side 11 of the floor plate 6, for example by turning the (cylindrical) screws.

The floor plate 6 has a multiplicity of thickened portions, of which only one thickened portion between two seat rail profiles 18, 19 is provided with a designation 17, which is representative for the rest of the thickened portions. The thickened portion 17 is an integral part of the floor plate 6. In case the floor plate 6 is produced in a known sandwich type of construction, the thickened portion 17 can be formed by the inserted core structure having a greater height in the region of the thickened portion 17 in comparison to a height of the core structure in the supporting areas 20, 21. In the two supporting areas 20, 21, the floor plate 6 bears on the seat rail profiles 18, 19 and is connected or adhesively fastened to these in a fixed manner by suitable fastening devices, which are not shown.

The thickened portion 17 extends over an overall depth 22 of the floor plate 6, parallel to the x-axis of the coordinate system 1.

In the region of the supporting areas 20, 21, the thickened portion 17 is configured in each case with a bevel in order to minimize the emergence of mechanical stresses. A width 23 of the thickened portion 17, parallel to the y-axis of the coordinate system 1, corresponds approximately to a seat rail distance 24 between the seat rail profiles 18, 19 in the exemplary embodiment of FIG. 2. In case the seat rail profile distances vary in areas and are not constant over the entire floor framework 2, a respective width of each thickened portion may correspond approximately to the seat rail profile distance concerned in order to achieve a flat supporting of the floor plate 6 on the floor framework 2.

An overall width 25 (parallel to the y-axis of the coordinate system 1) and the overall depth 22 of the floor plate 6 may be dimensioned so that the sub-assembly 14, leaving free an encompassing edge region or edge strip if necessary, is positioned completely upon the base area of the floor plate 6. The floor plate 6 is formed for example in one piece. Furthermore, in particular the overall width 25 of the floor plate 6 may be dimensioned so that it corresponds to the grid size of the seat rail distances, parallel to the y-axis of the coordinate system 1, of the seat rails 18, 19 and of the further seat rails if necessary.

The seat rail distances 24 between two adjacent seat rail profiles in each case can be constant, or can be locally varied if necessary. Furthermore, it is not absolutely necessary for the floor plate 6, as shown in FIG. 2, to have a multiplicity of thickened portions which are arranged in each case between two seat rail profiles. With lower demands on the statics of the floor plate 6, the integration of thickened portions into the floor plate 6 can be at least partially or completely disregarded.

Figure 3:
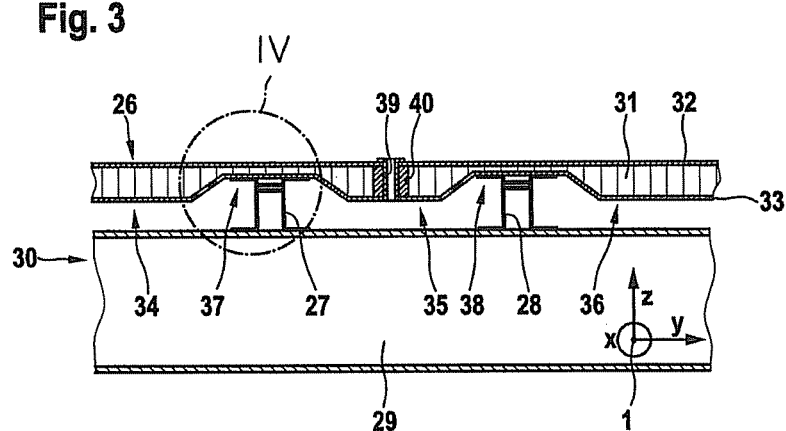
FIG. 3 shows a schematic plan view of a transverse beam with bearing seat rail profiles and a floor plate arranged thereupon.

FIG. 3 shows a basic sectional view of a floor plate which is arranged on a floor framework. The coordinate system 1 again illustrates the position of all the components in space.

A floor plate 26 bears on two seat rail profiles 27, 28 which in turn are connected to a transverse beam 29. Both the seat rail profiles 27, 28 and the transverse beam 29 are part of a floor framework 30. As apparent from FIG. 3, the floor plate 26 is formed in one piece and exemplarily has a core structure 31 which is designed in the form of a honeycomb, which is provided with facings 32, 33 on both sides. In the exemplary embodiment of FIG. 3 which is shown, the floor plate 26 has three thickened portions 34 to 36. In the region of the thickened portions 34 to 36, the core structure 31 has a greater height in comparison to two supporting areas 37, 38 of the floor plate 26. The floor plate 26 is connected to the seat rail profiles 27, 28 by means of fastening devices, which are not shown in more detail in FIG. 3, for example in the region of the two supporting areas 37, 38. In the region of the centre thickened portion 35 an insert 39 is embedded into the floor plate 26. The insert 39 is fastened in the floor plate 26 or in its core structure 31 by means of a curable and, if necessary, additionally expandable plastic material 40. The insert 39 advantageously has a female thread, as a result of which a connection of a sub-assembly, which is not shown in FIG. 3, by means of a conventional threaded connection is provided, with the simultaneous possibility of height compensation. The three thickened portions 34 to 36 with an approximately trapezoidal cross-sectional geometry in each case, or edge regions which extend in a bevelled manner (inclined) in each case, preferably have in each case a width (parallel to the y-axis of the coordinate system 1), which corresponds approximately to the respective seat rail profile distance. The seat rail profiles 27, 28 are similarly connected in a fixed manner to the transverse beam 29 by a plurality of fastening devices. As fastening devices for the connecting of all the components especially screws, rivets, straddling dowels, clamping connectors or snap-in connectors, or the like, come into consideration. Furthermore, an adhesive fastening, at least in sections, for example with double-sided adhesive strips, is also possible, as a result of which an additional introduction of elastic strips for damping the sound transmission in the contact areas or supporting areas between the floor plate 26, the seat rail profiles 27, 28 and the transverse beam 29 is dispensed with at the same time.

Alternatively, the floor plate 26 can also be formed partially or completely without thickened portions 34 to 36, that is to say the core structure 31 in this case has a constant height at least in areas. As standard, the floor plate 26, however, is provided with thickened portions 34 to 36, which are not shown, in order to also be able to support sub-assemblies with high weight and to avoid the provision of a multiplicity of floor plates which have different thickened portions, particularly as the weight of the floor plate 26 is not significantly increased as a result of the thickened portions 34 to 36.

Figure 4:
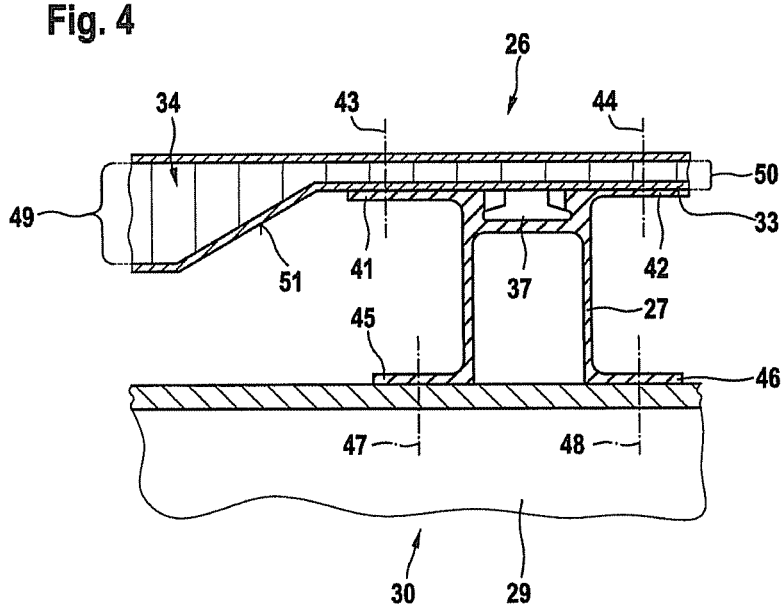
FIG. 4 shows an enlarged detail from FIG. 3.

FIG. 4 shows a detail enlargement from FIG. 3, the position of which is indicated with heavy line thickness by the circle which is shown in a broken line.

By its supporting area 37 or by the lower facing 33, the floor plate 26 bears on two top flanges 41, 42 of the seat rail profile 27 and is connected in a fixed manner to these with two fastening devices 43, 44. Two bottom flanges 45, 46 of the seat rail profile 27 are connected by means of the fastening devices 47, 48 to the transverse beam 29 of the floor framework 30. It is apparent from FIG. 4, furthermore, that a height 49 of the core structure 31 is significantly greater in the region of the thickened portion 34 than a height 50 in the region of the supporting area 37. A side surface 51 of the thickened portion 34 is inclined at an angle of about 30° with regard to the xy-plane of the coordinate system 1. Alternatively, inclination angles of the side surfaces of the thickened portions between about 15° and 60° are feasible. A further supporting surface of the thickened portion 34, which is not shown in FIG. 4, has an opposite inclination or angled position.

The floor plate according to the invention enables the fastening of sub-assemblies independently of the grid of the floor framework which is located beneath it. As a result of this, it becomes possible to realize customer-specific equipping wishes very quickly and with simultaneously reduced installation cost. Furthermore, the floor plate enables a weight reduction of the floor framework and a reduction of stockholding in comparison to conventional solutions.

What is claimed is:

1. A floor plate for covering a floor framework in an aircraft, wherein the floor framework comprises a plurality of transverse beams and with a plurality of longitudinal profiles extending at an angle of about 90° plurality of to the transverse beams,
    the floor plate comprising:
        at least one connecting point for fastening a sub-assembly to the floor plate independently of an installation point of the floor plate to the floor framework,
        a system port arranged in a center region of the floor plate for connecting the sub-assembly on the floor plate to a plurality of systems on board the aircraft comprising sockets and couplings,
        wherein the system port is integrated directly into the floor plate, and is configured to form a universal interfacing point between the sub-assembly and the plurality of systems on board the aircraft, and at least one of a plug and a coupling integrated into an underside of the sub-assembly capable of automatically making connections or contacts to the sockets and couplings of the system port, wherein the floor plate is configured to bear on the floor framework of the aircraft on at least four longitudinal profiles, and wherein the sub-assembly is directly fastenable to the floor plate, and the floor plate is connectable to the floor framework with fastening devices.

2. The floor plate according to claim 1, wherein the sub-assembly fastened on the floor plate is connected to an on-board system of the aircraft by the system port without the use of tools.

3. The floor plate according to claim 1, wherein the floor plate is provided with at least one structural reinforcement element, and wherein the at least one structural reinforcement element is an integral part of the floor plate.

4. The floor plate according to claim 3, wherein the at least one structural reinforcement element is at least one thickened portion.

5. The floor plate according to claim 4, wherein the at least one thickened portion has a width which corresponds to a seat rail distance between the plurality of longitudinal profiles.

6. The floor plate according to claim 1, wherein the floor plate is formed as a sandwich plate.

7. The floor plate according to claim 1, wherein the plurality of longitudinal profiles are formed as seat rail profiles.

8. The floor plate according to claim 1, wherein the floor plate is connected to the plurality of longitudinal profiles.

9. The floor plate according to claim 1, wherein the floor plate is connected to the floor framework with at least one of a plurality of screws and rivets.

10. The floor plate according to claim 1, wherein the floor plate is sized to be fastened on the floor framework in a manner that is positionaly variable.

11. The floor plate according to claim 1, wherein a surface of the floor plate is equal to or larger than a base area of the sub-assembly.

* * * * *